United States Patent [19]

Zwillich et al.

[11] 4,339,635
[45] Jul. 13, 1982

[54] ISOLATED PHASE BUS DISCONNECT SWITCH WITH GROUNDED OPERATING MECHANISM

[75] Inventors: Alexander Zwillich, Pittsburgh, Pa.; Jayant M. Patel, Symmes Township, Hamilton County, Ohio

[73] Assignee: Westinghouse Electric Corp., Pittsburgh, Pa.

[21] Appl. No.: 219,716

[22] Filed: Dec. 24, 1980

[51] Int. Cl.³ .......................................... H01H 31/32
[52] U.S. Cl. .................................. 200/48 R; 200/163
[58] Field of Search .............................. 200/48 R, 163

[56] References Cited

U.S. PATENT DOCUMENTS

| | | | |
|---|---|---|---|
| 2,008,139 | 7/1935 | Massey et al. | 200/163 |
| 2,229,006 | 1/1941 | Rudd | 200/48 R |
| 2,813,179 | 11/1957 | Rugg | 200/163 |
| 2,959,657 | 11/1960 | Albright | 200/163 |

Primary Examiner—John W. Shepperd
Attorney, Agent, or Firm—Robert E. Converse, Jr.

[57] ABSTRACT

A telescoping isolated phase bus disconnect switch includes a cylindrical outer housing at ground potential, a pair of coaxial fixed inner conductors at high potential, and a telescoping coaxial movable inner conductor bridging the two fixed inner conductors to perform a switching function. The movable inner conductor is supported on insulating means extending through the housing and mounted upon a movable carriage outside of the housing. The carriage is operated by a drive motor and mechanical linkage both located outside of the housing. The mechanical linkage produces a variable mechanical advantage, increasing its mechanical advantage over the movement range of the switch as the required closing force increases.

7 Claims, 5 Drawing Figures

ISOLATED PHASE BUS DISCONNECT SWITCH WITH GROUNDED OPERATING MECHANISM

BACKGROUND OF THE INVENTION

1. Field of the Invention

The invention relates generally to electrical switches and, more particularly, to high voltage, high current disconnect switches for use in isolated phase bus duct.

2. Description of the Prior Art

Disconnect switches in isolated phase bus ducts are used to electrically isolate components such as generators, circuit breakers, and step-up transformers. These switches employ a conductive outer housing at ground potential and an inner conductor disposed within the housing. The housing and inner conductor are adapted to be joined to corresponding housings and center conductors of isolated bus duct. The switches generally employ a fixed and a movable contact to open a circuit through the center conductor in response to actuation by an operating mechanism.

A typical switch is described in U.S. Pat. No. 4,188,515 issued Feb. 12, 1980 to Jayant M. Patel et al. and assigned to the assignee of the present application. The movable conductor consists of a telescoping sleeve assembly axially movable with respect to the center conductor and operated by an acme screw-worm gear-jack located centrally within the switch and driven through a shaft arranged perpendicularly to the longitudinal axis of the switch which penetrates the switch housing and inner conductor. This arrangement requires the shaft to be supported by bearings and electrically insulated from the high potential of the inner conductor. In addition, although the switch generally provides satisfactory performance, it would be desirable to provide a switch having simplified access to the operating mechanism to facilitate maintenance procedures. It would also be desirable to provide a switch which eliminates the problem of maintaining electrical isolation of the inner conductor from ground caused by the penetration of the drive shaft through the housing into the operating mechanism located therewithin.

SUMMARY OF THE INVENTION

In accordance with a preferred embodiment of the present invention, there is provided a disconnect switch for isolated phase bus duct which comprises a cylindrical housing of conductive material at ground potential, a two-part fixed cylindrical conductor coaxially disposed within the housing and electrically insulated therefrom, and a movable conductor member coaxially disposed within the housing to telescope and cooperate with the fixed cylindrical conductor to perform a switching function therewith. A movable carriage disposed outside of the housing carries insulating means connecting the carriage and the movable conductor, which means extend through apertures in the housing. An electro-mechanical drive mechanism for producing power to operate the movable conductor between open and closed positions is provided external to the housing. The drive mechanism and the carriage are connected by linkage means which produce a variable mechanical advantage along the path of movement of the movable conductor.

DESCRIPTION OF THE PREFERRED EMBODIMENT

Figure 1:
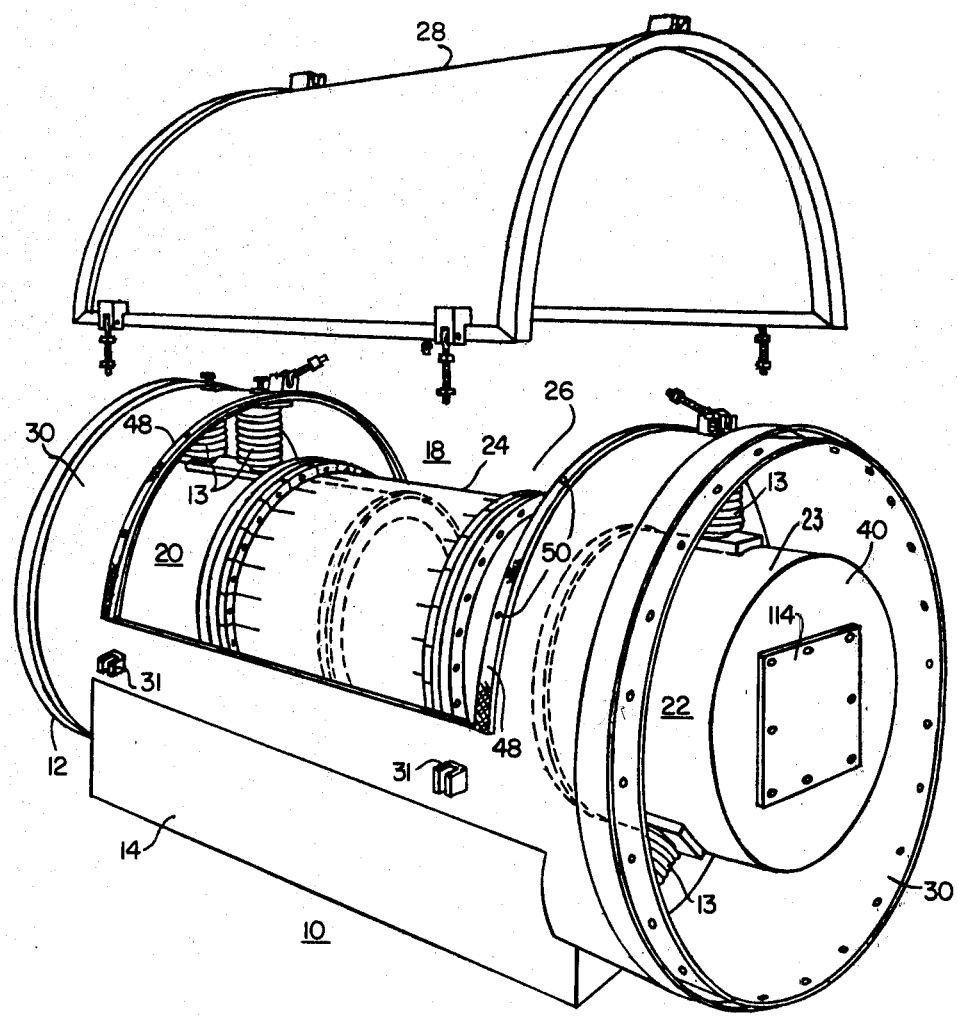
FIG. 1 is a perspective view of one phase switch unit of a multi-phase disconnect switch assembly constructed in accordance with the principles of the present invention.
Figure 2:
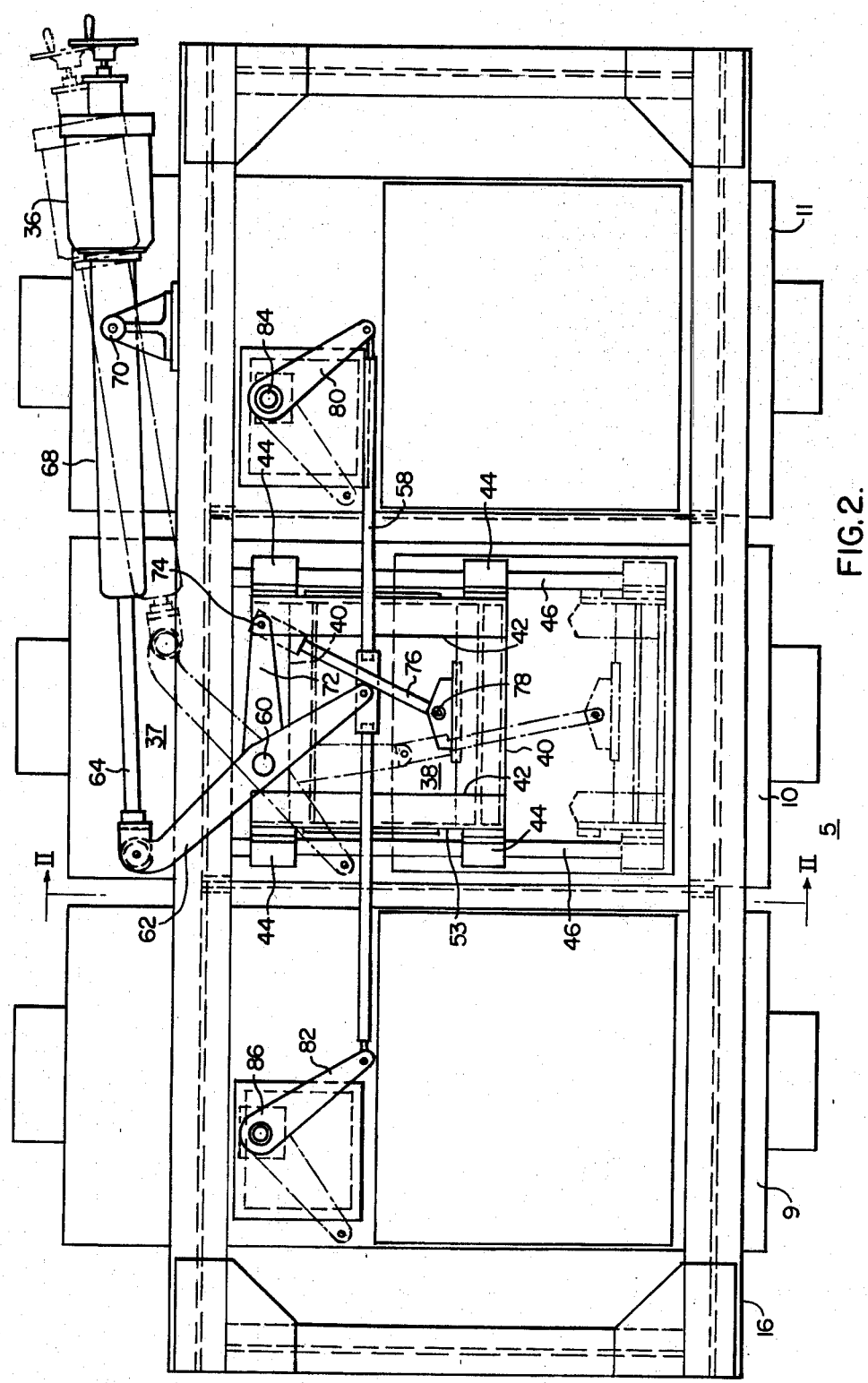
FIG. 2 is a bottom view of a three-phase switch assembly incorporating three of the units shown in FIG. 1.

Referring now to drawings, in which corresponding reference characters refer to corresponding members, there is shown in FIG. 1 a perspective view of one phase switch unit 10 of a three-phase telescoping disconnect switch assembly constructed in accordance with the principles of the present invention. The switch unit 10 comprises a generally cylindrical housing 12 constructed of aluminum. The housing 12 is welded to support plates 14 which are in turn attached to a structural supporting frame work 16 (FIG. 2). The switch 10 also comprises a center conductor assembly 18 coaxially mounted within the housing 12 and electrically insulated therefrom by insulators 13. The center conductor assembly 18 comprises first and second fixed center conductor members 20 and 22 adapted for electrical connection to the center conductor of adjacent isolated phase bus duct, and a telescoping sleeve assembly 24 which is axially movable to connect and disconnect the first and second fixed conductor members. As can be seen, the switch 10 includes a maintenance and inspection port 26 having a removable access cover 28.

FIG. 2 shows the three-phase telescoping disconnect switch assembly 5 comprising three individual phase switches 9, 10, and 11 which may be supported on the frame work 16 at an elevated level, vertical or inclined attitudes. A motor drive 36 is coupled to the switches 9, 10, and 11 by a linkage 37 to be more completely described hereinafter.

Figure 3:
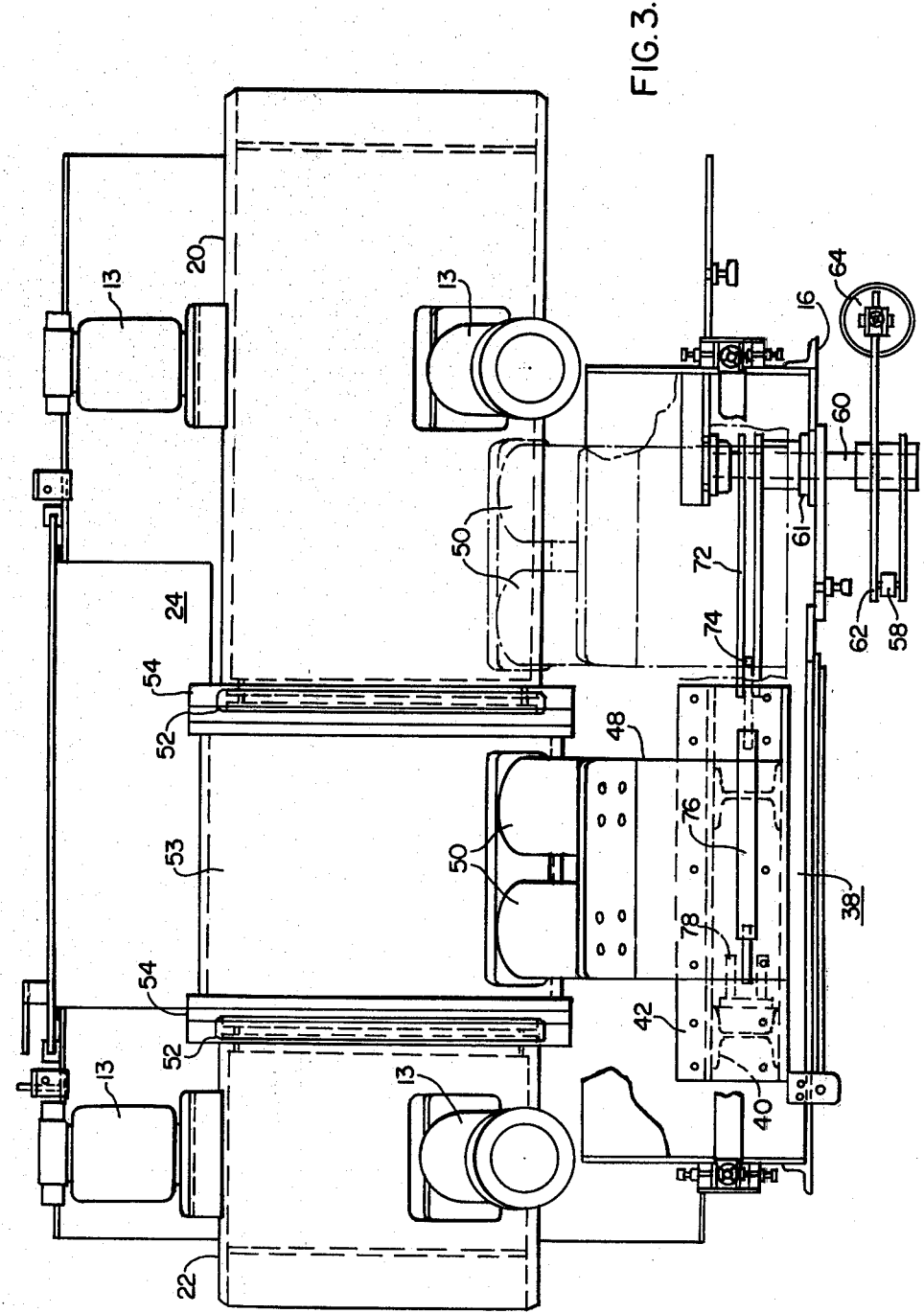
FIG. 3 is a transverse cross-section of a switch unit as shown in FIG. 1, taken along the line II—II of FIG. 2.
Figure 4:
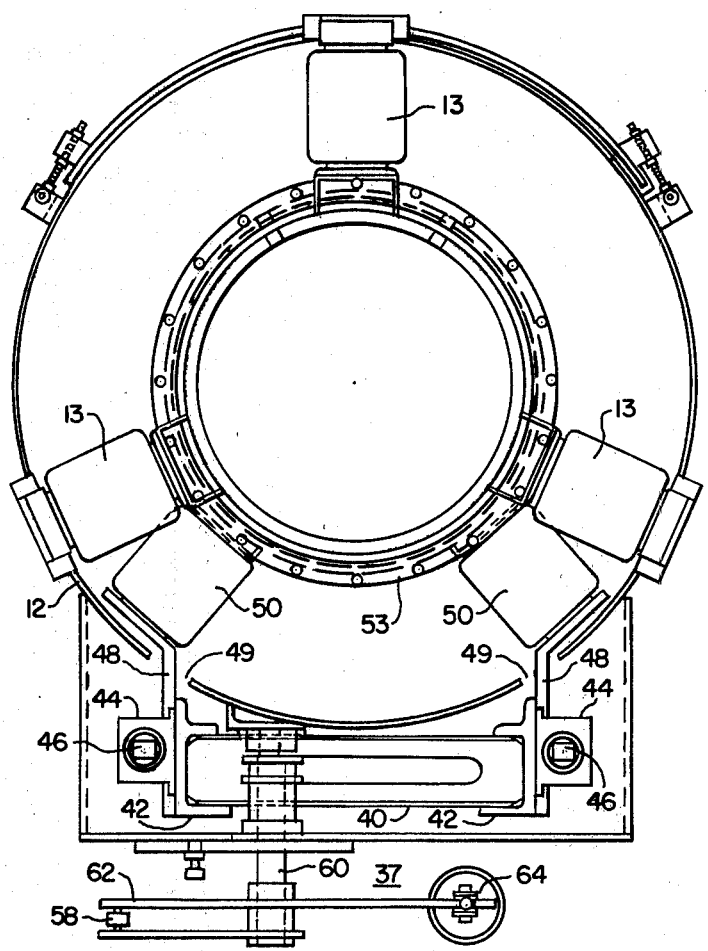
FIG. 4 is an end view of the switch unit shown in FIGS. 2 and 3.

The telescoping sleeve assembly 24 includes a carriage 38 comprising first and second lateral structural members 40 and first and second longitudinal structural members 42, as shown in FIG. 2, which form a support platform having bearings 44. The bearings 44 ride along rails 46 having a circular cross section, as can be seen in FIGS. 2 and 4. Attached to the bearings 44 are mounting brackets 48 (FIGS. 3 and 4) which extend through slots 49 in the housing 12 to support insulators 50 connected to a movable conductor 53 of the sleeve assembly 24. The entire telescoping sleeve assembly 24 including the carriage 38 is thus free to move back and forth along the rails 46 to perform a switching function to open and close a circuit through the fixed inner conductors 22 and 20, aided by fixed contacts 52 and movable contact assemblies 54. The position of the sleeve assembly 24 when in the closed position is shown most clearly in FIG. 3, with the open position shown in FIG. 1.

Motive power to operate the sleeve assembly 24 between the open and closed position on all three switches 9, 10, and 11 is provided by the motor drive 36 through the linkage 37 comprising a crank mechanism and an interphase coupler 58. Referring to FIGS. 2 and 3, it can be seen that a pivot shaft 60 is supported within bearings 61 by the frame structure 16. A main operating crank 62 is pivotally connected at a point between its ends to the shaft 60. One end of the main crank 62 is pivotally connected to one end of the bar 64 of a jack screw mechanism 66, the other end of which is mounted inside a sleeve 68 to be operated by the motor drive 36. As can be seen in FIG. 2, the sleeve 68 is pivotally connected at the point 70 to the frame structure 16.

Also fixedly attached to the pivot shaft 60 is an individual phase crank 72 which has its opposite end 74 connected to an adjustable link 76. The other end of the link 76 is pivotally connected to the carriage 38 at the point 78.

As can be seen most clearly in FIG. 2, the linkage mechanism 37 also includes the interphase coupler 58 pivotally connected to the main operating crank 62 at the opposite end thereof from the jack screw mechanism 66. The interphase coupler 58 is pivotally connected at each end to the outboard operating cranks 80 and 82 which are fixedly connected to individual phase operating shafts 84 and 86. In a manner similar to the phase switch 10, each of the outboard operating cranks 80 and 82 also has fixedly attached thereto an operating arm (not shown) similar to the arm 72 which is connected, through a link arm (not shown) similar to the arm 76 to carriages of the outer phase units 9 and 11.

Figure 5:
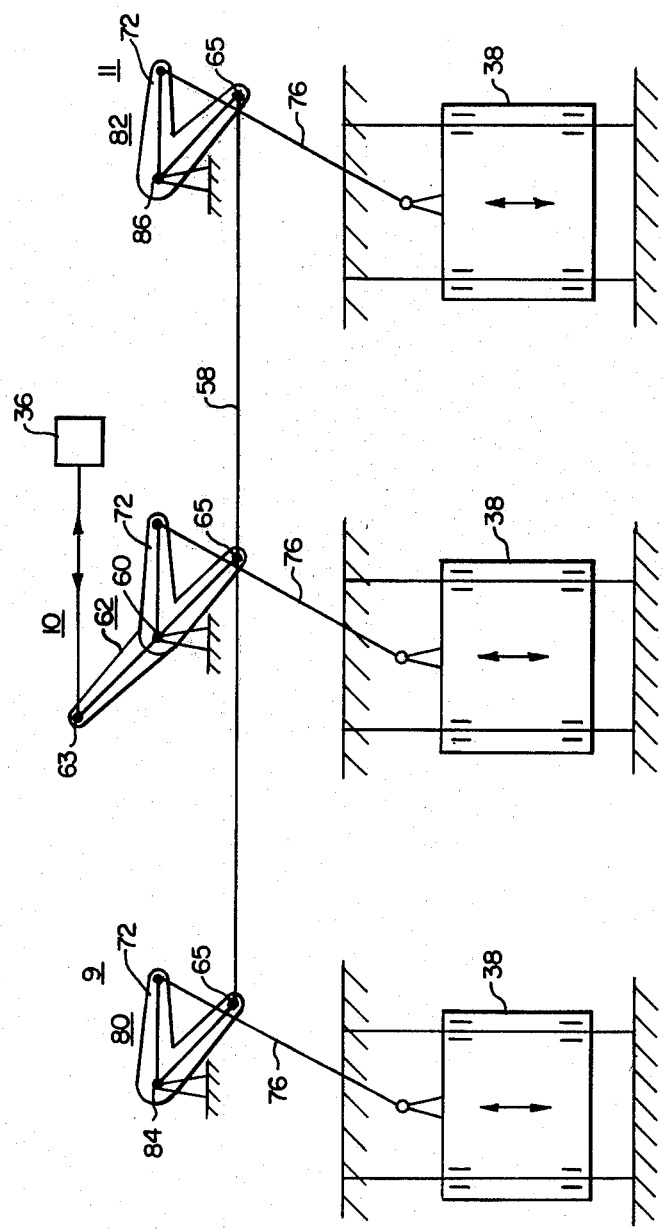
FIG. 5 is a mechanical schematic diagram of the drive and linkage mechanisms of the switch assembly shown in FIG. 2.

A schematic diagram of the drive and linkage means is shown in FIG. 5. As can be seen, the main operating shaft 60 is fixedly positioned to pivotally support the main operating crank 62. Motor force is supplied by the drive means 36 connected to an arm of the operating crank 62 at the point 63. The other end of the operating crank 62 pivots on the interphase coupler 58 at the point 65. The phase arm 72 connected to the crank 62 also pivots on the link 76, the other end of which is pivoted to the carriage 38 at the point 78.

Each end of the interphase coupler 58 is pivoted to an arm 65 of the outboard operating cranks 80 and 82. The outboard cranks 80 and 82 drive the links 76 through arms 72. At the initial position as shown in FIG. 5, motive force toward the right causes clockwise rotation of the crank 62 to produce leftward motion of the interphase coupler 58 and downward moving force upon the carriages 38. The low mechanical advantage resulting from the relative arrangement of mechanism components produces a high initial velocity of the carriages 38 with a low initial force. Continued motive force to the right causes continued clockwise rotation of the operating crank 62 with closing force applied to the carriages 38 with an increasing mechanical advantage at a decreasing speed and increasing force.

In operation, energizing the motor drive 36 moves the jack screw bar 64 inwardly within the sleeve 66 in a direction to the right as shown in FIG. 2. This causes clockwise rotation of the main operating crank 62 about the main operating shaft 60, causing corresponding clockwise rotation of the phase crank arm 72. This drives the link 76 toward the bottom as shown in FIG. 2 with a very low mechanical advantage producing a large translational motion of the carriage 38. Continued energization of the motor drive sustains clockwise rotation of the main operating crank 62 and the phase crank arm 72. However, as the rotation of the phase crank 72 continues, the mechanical advantage upon the carriage 38 increases due to the increasing angle between the phase crank 72 and the link 76. Thus, at the end of travel of the telescoping sleeve assembly toward the close position, where the contact assemblies 52 and 54 begin to mate causing a corresponding increase in resistance to further movement of the telescoping sleeve assembly, the increased mechanical advantage of the linkage mechanism 37 provides the needed closing force. The matching of the variable mechanical advantage of the linkage mechanism 37 to the varying closing force required by the switch 5 increases the efficiency of the complete mechanism, and allows the use of a smaller operating motor than would be otherwise the case.

Correspondingly, the mechanism produces an opening operation having a high initial opening force with low initial velocity of the carriage. Continued opening operation results in decreasing opening force and increasing opening velocity.

As can be seen in FIG. 3, all of the linkage and drive mechanism components are located outside of the switch housing 12 and are at ground potential. Thus, the only insulation required is the main support insulators 13 and the insulators 50 between the carriage 38 and the movable conductor 53. This eliminates the problem present in prior art disconnect switches of maintaining electrical isolation between the inner conductor at high potential and the operating mechanism at low potential within the grounded housing.

It can be seen therefore that the present invention provides an isolated phase bus disconnect switch having higher efficiency and a less complex potential isolation system than the prior art.

We claim:

1. An isolated phase bus disconnect switch, comprising;
    a hollow outer conductor at ground potential;
    a fixed two-part inner conductor at high potential, insulatingly supported within said outer conductor and concentric therewith;
    a movable inner conductor at high potential internal to said outer conductor, longitudinally movable between open and closed positions with respect to said fixed inner conductor, and cooperating with said fixed inner conductor to perform a switching function therewith;
    movable support means external to said outer conductor for operating said movable conductor between open and closed positions;
    insulating means extending through apertures in said outer conductor for connecting said movable conductor and said support means;
    mechanical drive means external to said outer conductor for operating said movable inner conductor between open and closed positions; and
    linkage means external to said outer conductor for connecting said drive means and said support means.

2. A switch as recited in claim 1 wherein said linkage means produces a variable mechanical advantage.

3. A switch as recited in claim 2 wherein said linkage means produces a higher mechanical advantage when said movable conductor is near the closed position and a lower mechanical advantage when said movable conductor is near the open position.

4. A switch as recited in claim 2 wherein said linkage means comprises a crank member and a bar connecting said crank member and said drive means.

5. A switch as recited in claim 4 wherein said bar is movable in a direction substantially perpendicular to the longitudinal axis of said housing.

6. A switch as recited in claim 1 wherein said outer conductor is cylindrically shaped.

7. A switch as recited in claim 1 wherein said linkage is at ground potential.

* * * * *